May 1, 1956   J. A. LINDBERG ET AL   2,743,805
SAFETY CLUTCH
Filed Aug. 16, 1951
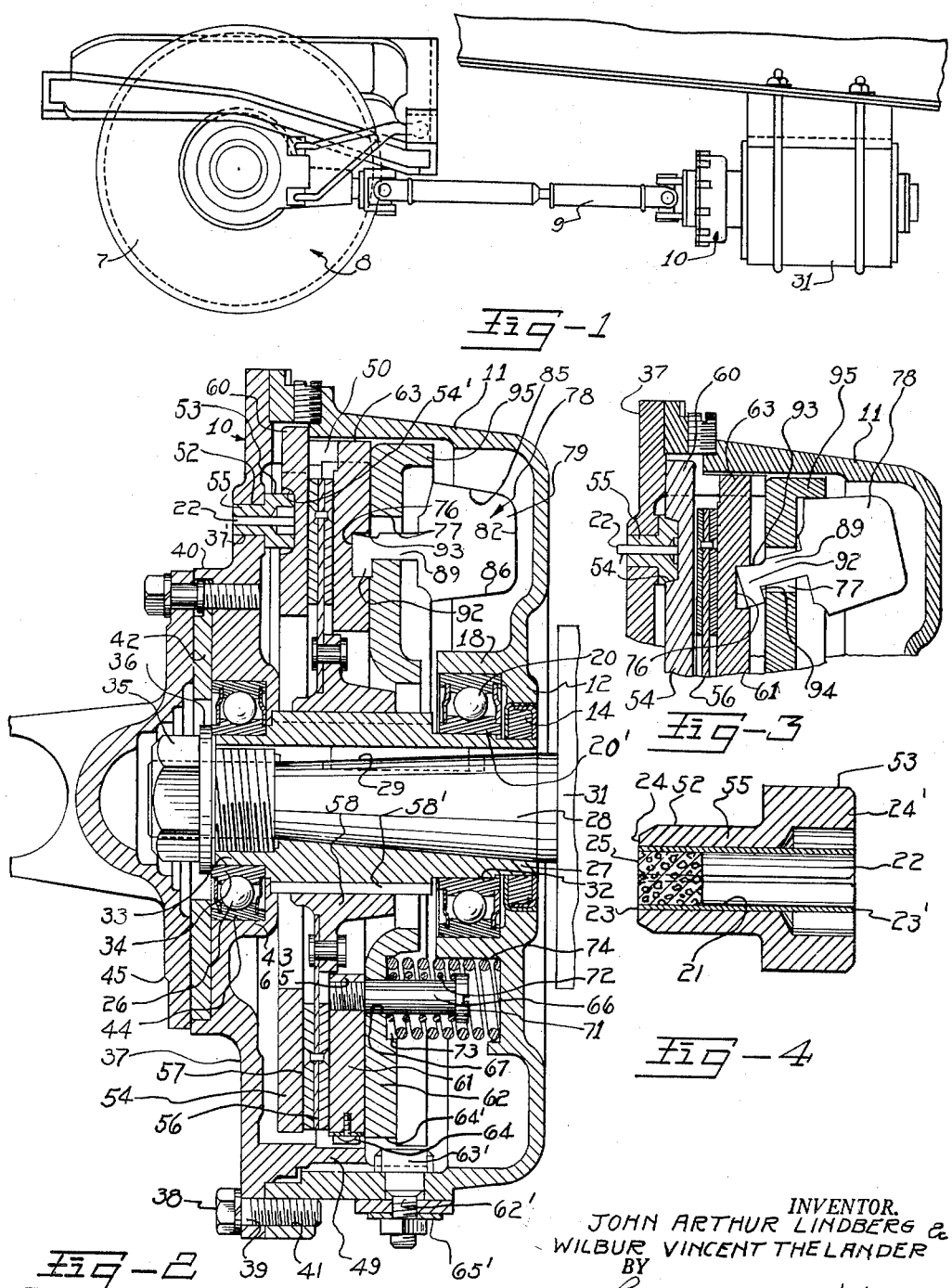
INVENTOR.
JOHN ARTHUR LINDBERG &
WILBUR VINCENT THELANDER
BY
Lawrence C. Witker
ATTORNEY United States Patent Office 2,743,805
Patented May 1, 1956

2,743,805

SAFETY CLUTCH

John Arthur Lindberg and Wilbur Vincent Thelander, Toledo, Ohio, assignors to Dana Corporation, Toledo, Ohio, a corporation of Virginia Application August 16, 1951, Serial No. 242,056

5 Claims. (Cl. 192—82)

This invention relates to generally improved clutch and drive mechanism of the character used for instituting a driving connection between driving and driven means and is further directed to a novel safety clutch of this character through which such means are coupled together and which is capable of withstanding predetermined overloads incident to normal operation, but which will disrupt the driving connection when excessive and prolonged loads incident to abnormal operation are encountered, and is more particularly directed to means for indicating such disrupted operation.

An object of the invention is to provide a clutch with a driving or driven member including locating elements designed to withstand normal excessive loads but which will automatically cause rapid disruption of the driving connection when abnormal loads or excessive overloads are encountered. More specifically an object of this invention resides in the provision of a clutch with a driving or driven member having a friction plate rotatable therewith and capable of axial movement with respect thereto, located by means of buttons adapted to collapse or soften to disrupt the driving connection in response to excessive heat generated by slippage of the clutch due to abnormal loads and wherein such buttons are provided with pins so located in the buttons that when the buttons collapse the pins will protrude from the clutch housing visually indicating the disruption in operation.

More broadly stated, it is an object of the present invention to provide a clutch, capable of frictional engagement which will slip under excessive load and if excessive load is maintained for even a short period of time will automatically cause disruption of the driving connection, with means for indicating disruption between the driving and the driven members due to such excessive or abnormal loads.

The foregoing and further objects of the present invention will fully appear from a study of the following detailed description when taken in connection with the accompanying drawing, in which:

Figure 1 is a side view illustrating a portion of a railway car or like vehicle and shows one of the modes of employing the clutch mechanism of the invention;

Figure 2 is a vertical sectional view through a form of the invention;

Figure 3 is a fragmentary sectional view of the upper portion of the clutch shown in Figure 2 illustrating the weight there shown in its limiting position against its stop and showing one of the spacing buttons collapsed in response to heat caused by excessive or abnormal load on the clutch and the indicator pin projected by the pressure from the driving plate due to the collapse of the spacing button; and Figure 4 is an enlarged sectional detail view of the button and indicator assembly.

For the purpose of illustrating a mode of employing the clutch structure of the invention a suitable installation has been shown in Figure 1. A generator unit 31 is suitably secured to a car frame and is coupled by means of clutch 10 and a propeller shaft 9 to an axle drive mechanism 8, which receives its driving energy from the wheel 7. It is to be understood, however, that the invention is applicable to many other uses and installations, and Figure 1 is merely illustrative. With particular reference to Figure 2 the clutch generally shown at 10 includes a casing or clutch housing 11 of general cup shape with an entire end open as shown at the left of the view. A relatively small opening is formed at the right end of casing 11 and is defined by an inwardly extending flange 12 adapted to receive and to support a combined sealing and lubricant retainer assembly 14. Adjacent the flange 12 is formed an interiorly extending concentric flange 18 which serves as a positioning member for a bearing assembly 20.

Inner race 20' of bearing assembly 20 is adapted to rotatably support one end of an exteriorly splined sleeve 27 suitably connected to a driven shaft 28 as by a key and slot assembly as shown at 29 or other similar means. Shaft 28 may in turn be connected to any suitable unit such as indicated at 31 to effect a drive thereof. In the present instance driven unit 31 comprises a generator or compressor or like unit and shaft 28 is rotatably supported therein in bearings (not shown). Sleeve 27 is formed at its outer periphery adjacent one end with a reduced portion 32 of a shape to accommodate race 20' and is provided at its opposite end with a reduced portion 33 positioned to receive an inner race 34 of a second bearing assembly 26.

Sleeve 27 has a tapered interior and receives a correspondingly tapered end of shaft 28, the end of shaft 28 opposite from unit 31 being reduced in size and threaded to receive a nut 35 in conjunction with a washer 36, the latter cooperating with reduced portion 33 to receive bearing race 34. It will thus be observed that by reason of the tapered fit of shaft 28 within tube 27, the connection of nut 35 therewith and the key assembly 29, shaft 28 is effectively secured to sleeve 27 to rotate therewith and be driven thereby.

A cover plate 37 is provided on the end of casing 11 opposite from flange 12 which is of the same general shape as the cross section of casing 11 and is arranged to be secured thereto by suitable cap screws 38 projecting through holes 39 in plate 37 registering with threaded holes 41 formed in casing 11. Plate 37 is provided with an opening at its center which is defined by an enlarged portion or flange 43 adapted to receive and support an outer race 44 of bearing assembly 26.

Centrally of the cover plate 37 is an annular flange 40 providing a recess within which is received a bearing retainer 42 for the bearing 26. The bearing retainer is in turn positioned by means of a plurality of studs threaded into suitable openings in the cover plate. The studs also serve to locate a driving member which in the present instance is a yoke plate 45 of a universal joint structure, the flange portion thereof being secured to the cover plate 37 by nuts threaded onto the studs. Adjacent the perpihery of the cover plate 37, is an annular projection 49 adapted to be freely received within the open end of casing 11. The projection 49 is formed with open ended slots 50 preferably arranged at 120° intervals therearound, for a purpose hereinafter described.

With reference to the engaging and disengaging elements of the clutch mechanism, a plate 54 is located interiorly of casing 11 adjacent cover plate 37, and normally serves as a driving plate for the clutch mechanism. The plate 54 is secured against rotation relative to the casing 11 by driving projections 60 thereon, received within the slots 59 in plate projection 49. Carried by the cover plate 37 are a plurality of spacing or locating buttons or studs 55 preferably six in number, which do not carry any of the driving load between the casing and the plate, but serve to locate the plate 54 in spaced relation with respect to the cover plate 37.

The buttons 55 have a shank portion 52 received within openings 37' in the cover plate 37 and counterbored head portions 53 received in recesses 54' in the driving or friction plate 54. Buttons 55 may be of any suitable metal or metal alloy, such for example, as zinc combined with relatively small percentages of one or more metals such as tin, copper and aluminum which have a sufficiently low melting point to permit the heat due to abnormal slippage to soften the buttons to a point where engagement between the friction plate 54 and clutch plate, now to be described, is disrupted. Buttons 55 have longitudinal bores 21 centrally located which receive indicator pins 22 whose ends 23 and 23' are normally flush with button end faces 24 and 24' respectively. Indicator pins 22 are preferably longitudinally split sleeve springs, as shown in Figure 4, and being tubular are of open ended form. To prevent the ingress of dirt and other foreign matter to the mechanism in casing 11, indicators 22 are closed at their outer ends 23 by cork inserts or other suitable resilient or compressible plugs as at 25. The cylindrical indicators 22, being of spring metal are formed to exert an expansive force against the walls of bores 21 in the buttons sufficient to be retained in their initial positions until sufficient force, hereinafter described, causes their outward projection. When desired or necessary, the buttons 55 are readily replaced, it being only necessary to push the old buttons out of the openings and insert new.

Heretofore, it has been difficult to ascertain definitely that the buttons have collapsed, as the head portions 53, being in contact with driving plate 54, soften in response to excessive heat to immediately permit disengagement of the clutch. Due to the arrangement of the indicator pin 22 in contact with plate 54, the pin 22 is projected outwardly upon movement of the plate 54 toward cover plate 37. Thus, when the vehicle and unit is stationary, and the buttons collapsed, inspection will readily indicate that the clutch is not capable of driving the generator 31 when the rail car or vehicle is moving.

Adjacent the inner face of plate 54 and mounted on and to rotate with sleeve 27 is a driven member or clutch plate 56 preferably formed of thin sheet metal or like material and provided immediately adjacent plate 54 with concentric rings 57 of suitable friction material such as fabric, leather or of any suitable composition. Plate 56 is secured to a hub member 58 by rivets 59, the hub member being splined on its interior to engage splines 58' of sleeve 27 thereby providing means for transmitting power from plate 56 to shaft 28.

Adjacent the face of rings 57, away from plate 54, is a pressure plate 61 arranged to be moved in a direction parallel to the axis of shaft 28 in a manner to be presently described, and in so doing effect engagement and disengagement of the clutch mechanism. Adjacent pressure plate 61, a reaction member or plate 62 is positioned which is designed for a movement in a direction parallel to the axis of shaft 28. The plate 61 is secured against rotation relative to casing 11 by driving projections 63 positioned around the periphery of plate 61 and extending into slots 50 in the cover plate projections 49.

Pressure plate 61 is provided with a plurality of threaded openings 65, preferably corresponding in number to projections 63 on plate 61. Openings 65 receive studs 66 projecting through openings 67 in reaction plate 62 and prevent rotation of the reaction plate relative to plate 61. It will be observed that the mechanism just described establishes a driving connection between plates 61 and 62 and casing 11, and yet permits the plates to undergo axial movement with respect to each other and casing 11. A clearance between bolts 66 and openings 67 is provided, preferably sufficient to allow reaction plate 62 to undergo slight tilting movements for a purpose that will presently appear.

Means are provided in the form of leaf springs, one of which is shown at 64, spaced about the periphery of pressure plate 61 and secured thereto intermediate their ends by any suitable means, the legs of which bear against the projection 49 to resiliently locate or centralize the plate 61 with respect to the axis of the clutch. In order to locate reaction plate 62 with respect to the casing 11, to prevent relative rotary movement but permit axial movement therebetween, a plurality of bolts 62' are positioned in suitable openings in the casing 11 so that their heads 63' engage in transverse slots 64' in the periphery of the plate 62. The bolts 62' are equally spaced about the casing and further serve as means to receive balancing washers 65' on the shanks thereof. By varying the number or size of the washers 65' on the several bolts, the structure may be properly balanced, as will be readily understood.

The studs 66 are provided with enlarged ends or heads 71. Each stud 66 is encircled by a coil spring 72 of a diameter slightly greater than that of the stud. Springs 72 abut recesses 73 provided in reaction plate 62 and act against heads 71 and react against plate 62 and thereby operate to urge plates 61 and 62 together and disengage the clutch mechanism in a manner presently to be described and they will be hereinafter termed holdback springs. The hold-back assemblies are also encircled by compression springs 74 whose ends are received in suitable recesses formed in the interior face of casing 11. Springs 74 urge the driving and reaction plate assembly to the left toward the driven member, and although in the present embodiment of the invention, the preferred number of such spring assemblies is six, it is to be understood that the number thereof may readily be varied and it is not intended to restrict the exact number that may be used.

As just explained, the pressure and reaction plate assembly is urged to the left toward the clutch plate 56 by springs 74 and in order to prevent the latter from bringing the pressure and clutch plates into engagement when the prime mover is operating below a predetermined speed, we preferably arrange the reaction plate 62 to abut the end of cover projection 49 to limit movement of the reaction plate to the left by engagement therewith. Although we have illustrated one particular form of means for exerting a movement limiting action on plate 61, it is to be understood that any other suitable means may be employed for effecting this result without departure from the spirit of the present invention. However, it will be clear that the projecting flange 49 serves as means for providing clearance between plates 54 and 61 and the clutch facings 57 which enables the generator 31 to be motored, or any other unit connected in place thereof to be freely rotated for test, repair or adjustment purposes without the necessity of releasing or fastening any of the elements.

With reference to the speed responsive means for effecting engagement and disengagement of the clutch mechanism any suitable speed responsive mechanism may be utilized but in the present embodiment of the invention it comprises centrifugally operable mechanism. To this end plate 61 is provided on the face opposite to that cooperating with driven plate 56, with a series of recesses, one of which is indicated at 76. Recesses 76 are preferably rectangular in shape with the longer dimension of the rectangle running as a portion of a chord across driving plate 61. Recesses 76 are of like number and correspond in position to a series of apertures 77 of general rectangular shape formed in reaction plate 62. While on the opposite faces of plate 62 apertures 77 are rectangular in shape, it will be observed that the rectangles are of different size and the sides of the apertures nearest the periphery of plate 62 are spaced from corresponding sides of the apertures in plate 61 and hence afford a clearance, the purpose of which will be hereinafter described.

A series of speed responsive elements or weights 78 with levers 89 thereon are provided in apertures 77 of plate 62. Each element 78 comprises a weight 79 of the hexagonal shape illustrated, with opposite parallel faces 81 and 82 substantially equal in length. Opposite sides 85 and 86 are not only of different lengths but are not parallel.

At the opposite end of lever 89 and preferably formed integral therewith, is a head 92 of substantially the same size and shape as recesses 76 with the exception of the face nearest the periphery of plate 61, which is preferably bevelled as shown at 93. Head 92 is of somewhat greater depth than recess 76 and projects therefrom a substantial amount to space plates 61 and 62 apart against the action of springs 72.

With the driving member rotating below the engaging speed of the clutch, the parts assume the positions shown in Figure 2 and with the parts so disposed, the operation of this preferred embodiment of the clutch of the invention in response to acceleration of the driving member will now be described. The direction of power transmission is normally from yoke plate 45 to unit 31. In the position shown in Figure 2, the various elements are in the idling position wherein no power is being transmitted. It will be observed that clutch plate 56 is free from positive contact with driven plate 54 as well as the driving face of pressure plate 61, plate 61 being held back against contact with driven plate 56 by springs 72 acting against reaction plate 62, which in turn is held in the position shown in Figure 2 by reason of engagement of its peripheral edge with the end of projection 49. Shaft 28 and casing 11 are thus free to rotate relative to one another.

Casing 11 is rotated from a suitable source of power and as the speed of rotation increases above a predetermined idling speed, centrifugal force acts upon 79 and causes them to rock outwardly toward the periphery of casing 11. As they rock, levers 89 are carried therewith and heads 92 tilt and are partially removed from their positions in recesses 76. Levers 89 rock about the edges of faces 93 which are seated in the outermost corners of recesses 76, and in so doing, the rear faces of heads 92 react against the contacting faces of reaction plate 62 through reaction faces or edges 94 formed on heads 92. This movement of heads 92 causes driving plate 61 and reaction plate 62 to separate against the action of springs 72, and results in driven member 56 being frictionally gripped between plate 61 and plate 54 of casing 11. When the driven member has been frictionally gripped in the manner just described movement of plate 61 under the influence of weights 78 is substantially arrested, and further outward rocking movement of weights 78, in response to a further increase of speed of the driving member, causes reaction plate 62 to move to the right out of engagement with projection 49, against the action of springs 74. Upon initiation of this operation, a torque of low and slowly increasing magnitude is transmitted from the driving to the driven plates and as the operation proceeds, in response to continued acceleration of the driving member, pressure is built up on spring 74 and between the surfaces of the plates. As the speed increases, the plate pressure increases. This proportional increase is desirable since it affords means by which slippage of the clutch may occur at the lower speeds when the power connection is first being established and the prime mover is initially picking up the load, thus avoiding any jerky engagement which may prove injurious to the clutch or the unit being driven.

As the engaging operation is proceeding and reaction plate moves to the right and builds up pressure in springs 74, it is apparent that should the weights 78 move unevenly or irregularly, and tend to apply a greater force to one or more localized portions of plate 61, plate 62 may tilt or rock slightly and tend to compensate for such action, and thereby insure the application of substantially uniformly distributed forces to plate 61.

Continued increase in the speed of rotation of casing 11 causes weights 78 to swing outwardly to a greater extent and increase the pressure between the driving and driven elements until weight portions 79 contact with a flange 95 preferably integrally formed with reaction plate 62. Flange 95 prevents further movement of weights 78 and insures the maintenance of a constant pressure between the contacting elements at all higher speeds of rotation. The relation of the parts under these conditions is illustrated in Figure 3.

As the speed of rotation of casing 11 decreases the action of the clutch will be just the reverse of that described above. Springs 72 force plates 61 and 62 together and brings weights 78 into their inner or disengaged positions, and springs 74 force plate 62 against flange 49 against action of the decreasing centrifugal force tending to force weights 78 outwardly. As plates 61 and 62 come together, pressure between the driving and driven elements is released and an idling phase is again established.

From the foregoing description, the operation of the clutch during normal driving conditions and under normal loads will be clearly understood.

Likewise, it will be understood that under abnormal conditions, for example when excessive or abnormal load is imposed upon the clutch, means have been provided to disrupt the driving connection so that there will be free relative rotation between the casing 11 and clutch plate 56. The buttons 55 being of suitable meltable material become heated due to the heat of friction between the friction plate 54 and clutch plate 56 as a result of such abnormal slippage, resulting in the melting down or collapsing of the buttons, sufficiently to permit the plate 54 to be forced away from the clutch plate due to the action of springs 74 to provide sufficient clearance and permit relative rotation between plate 54 and the clutch plate, also shown in Figure 3. It will be noted that due to the fact that weights 78 have reached the limit of their outward movement by reason of engagement with the flange 95, such arrangement provides a means for limiting the movement of pressure plate 61 to permit the free rotation of clutch 56 when the buttons 55 have collapsed to thereby disrupt the driving connection between plates 54, 56, and 61, and thus between the casing 11 and shaft 28. It is to be further noted that the buttons 55 do not shear upon becoming softened due to the positive driving connection between the projections 60 and slot 50. It will also be noted that as the buttons 55 collapse the pressure from plate 54 will force the indicator pins 22 outwardly so that they protrude from cover 37 indicating that the buttons have collapsed.

Therefore, a clutch has been provided which is not only capable of automatic engagement and disengagement during normal operation, but also capable of slipping in response to abnormal load or overload for completely disrupting the driving connection, and thereby prevent damage to the clutch and mechanisms coupled thereby. Furthermore such a clutch has been provided with means to visually indicating the collapse of one or more of the buttons. Thus, the clutch has particular utility in railway car installation, for example where it is desirable to quickly and easily ascertain that the clutch is capable of satisfactory operation, or that the buttons need replacement prior to further operation.

Although the foregoing description relates more particularly to an automatic clutch, it is to be understood that the safety features as well as the general arrangement of the elements can be incorporated in other types of clutches.

What we claim is:

1. In a clutch, the combination with a casing, a driven member in said casing, a driving member in said casing rotatable therewith and movable axially thereof, and temperature responsive means for positioning said driving member axially of said casing and in driving relation with respect to said driven member, said temperature responsive means having a longitudinal bore therethrough and being adapted to disrupt the driving connection between said driving and driven member in response to the heat generated by abnormal slipping between said members, of means projectable from the exterior of said casing for indicating disruption of the driving connection, said means comprising a sleeve spring member retained in the bore in said temperature responsive means by exerting an expansive force against the walls of the bore therein.

2. In a clutch the combination of a casing, a friction plate rotatable with said casing and movable axially thereof, heat responsive means between said casing and said plate for normally positioning said plate, and a member in said casing adapted to be driven by said casing and arranged to slip relative to said plate in response to abnormal load, said heat responsive means being collapsible to permit the plate to move axially of said casing to disrupt the drive between said casing and said driven member and indicating means associated with said heat responsive means and projectable from said casing by axial movement of said plate to indicate disruption of the drive between said casing and said driven member, said heat responsive means comprising a plurality of meltable buttons, each having a central bore and said indicating means comprising a plurality of spring metal split sleeves disposed longitudinally in the bores of said heat responsive means.

3. In a clutch, the combination of a casing, a driving plate, a pressure plate, a friction plate interposed between said driving and pressure plates, means for urging said pressure plate into engagement with said friction plate and said friction plate into engagement with said driving plate, said means permitting slipping between said plates in response to abnormal or excessive loads, button means between said casing and said driving plate for normally positioning said driving plate in driving position, said button means being collapsible in response to heat generated by abnormal slipping to release said driving plate from driving position, and longitudinally split cylindrical indicating means projectable from said button means upon disruption of said driving connection, said indicating means being normally frictionally retained within said button means and movable with respect thereto upon movement of said driving plate out of driving position.

4. In sub-combination in a clutch of the class described, a casing, a plate rotatable with and axially movable with respect to said casing, a stud carried by said casing and engageable with said plate for normally limiting axial movement thereof in one direction, said stud having a longitudinal bore and a meltable head portion which when collapsed permits axial movement of said plate in such direction, and a longitudinally split tubular sleeve member in the bore in said stud adapted to protrude from said casing in response to axial movement of said plate due to collapse of said meltable button.

5. In sub-combination in a clutch of the class described, a casing, driving and driven elements in said casing, means in said casing for establishing drive between said driving and driven elements, a collapsible button carried by said casing for disrupting the drive in response to excessive slip between said elements, said button having a stud portion and a head portion, a longitudinal bore in said stud and head portions, a split tubular sleeve in the bore movable in response to predetermined pressure on one end thereof to indicate disruption in the drive between said elements, and a compressible sealing plug in the other end of said sleeve to prevent the ingress of foreign matter to said casing.

References Cited in the file of this patent

UNITED STATES PATENTS

| | | |
|---|---|---|
| 1,361,000 | Blain | Dec. 7, 1920 |
| 1,632,526 | Willgoos | June 14, 1927 |
| 2,057,876 | Berry | Oct. 20, 1936 |
| 2,224,440 | Lewis | Dec. 10, 1940 |
| 2,314,227 | Lieberherr | Mar. 16, 1943 |
| 2,539,534 | Eckhardt | Jan. 30, 1951 |